United States Patent [19]
Calhoun

[11] 3,911,740
[45] Oct. 14, 1975

[54] METHOD OF AND APPARATUS FOR MEASURING PROPERTIES OF DRILLING MUD IN AN UNDERWATER WELL

[75] Inventor: Charles W. Calhoun, Houston, Tex.

[73] Assignee: C. Jim Stewart & Stevenson, Inc., Houston, Tex.

[22] Filed: Mar. 29, 1974

[21] Appl. No.: 456,400

[30] Foreign Application Priority Data
June 21, 1973 United Kingdom............... 29529/73

[52] U.S. Cl..................................... 73/153; 175/48
[51] Int. Cl.².......................................... E21B 47/06
[58] Field of Search.......... 73/153, 151, 152; 175/5, 175/48, 58

[56] References Cited
UNITED STATES PATENTS

| | | |
|---|---|---|
| 3,031,891 | 5/1962 | Dower .................................. 73/438 |
| 3,465,582 | 9/1969 | Richter, Jr. et al.................... 73/152 |
| 3,731,530 | 5/1973 | Tangny et al. ........................ 73/153 |
| 3,811,322 | 5/1974 | Swenson ............................... 73/155 |

*Primary Examiner*—Jerry W. Myracle
*Attorney, Agent, or Firm*—Fulbright & Jaworski

[57] ABSTRACT

Measuring the weight and the amount of gas in drilling mud in an underwater well by collecting a sample of mud from the drilling annulus at a point underwater in a closed container under ambient conditions, and measuring the weight of the mud in the container. Expanding the size of the container an amount to reduce the pressure to a predetermined pressure, monitoring the pressure in the container, and measuring the amount of expansion of the container required to reduce the pressure a predetermined amount which is an indication of the amount of gas in the drilling mud.

8 Claims, 2 Drawing Figures

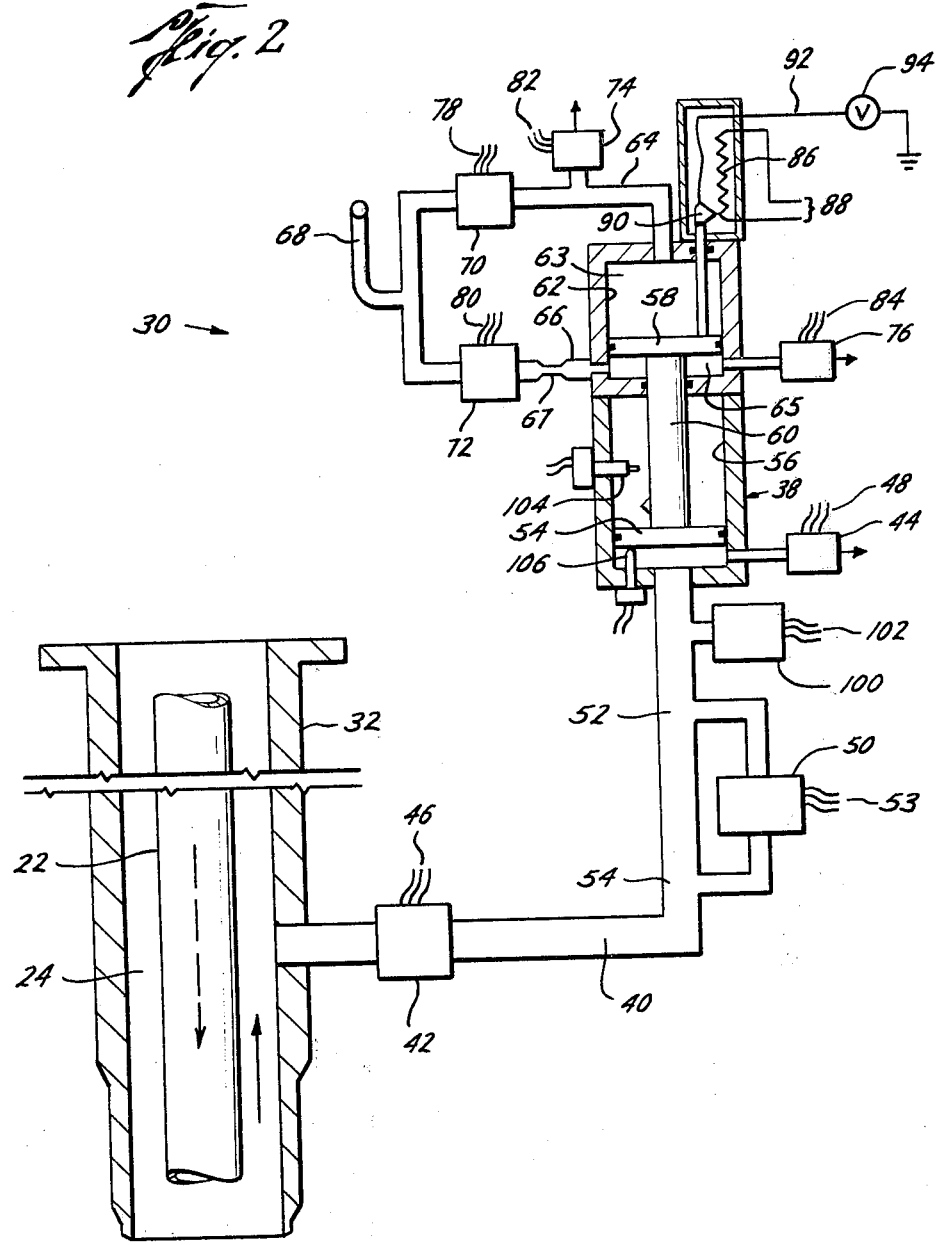

METHOD OF AND APPARATUS FOR MEASURING PROPERTIES OF DRILLING MUD IN AN UNDERWATER WELL

BACKGROUND OF THE INVENTION

Generally, in drilling underwater wells, mud is injected into a drilling pipe from the water surface, pumped down the drill pipe or string and emerges from the bit and returns to the surface through a riser pipe from the well bore. The drilling mud performs the function of tending to cake around the bore hole preventing caveins, tends to create bottom hole pressure that prevents a blowout when a high pressure gas zone is encountered, acts as a lubricant to reduce frictional losses, and removes cutting chips produced by drilling. In order for the mud to accomplish its various functions, various tests are performed on the mud, such as measuring the mud weight and any gas content thereof. Some of the popular methods to measure mud weight are (1) removing a precise amount of mud and weighing the amount on a precision scale, (2) placing a cylinder or ball into the mud pit and measuring its buoyancy, (3) measuring the differential pressure for 1 column foot of mud by a differential pressure transducer. Various ways to measure the gas content of the mud are (1) measuring thermal conductivity with a hot wire filament in which the presence of gas will sink more heat from the filament than a sample without gas, and (2) comparing the mud weight coming from the bore hole against the mud weight being injected into the bore hole.

The present test methods work very well and give an accurate analysis of the mud. However, these methods are used to test the mud only after the drilling mud has reached the water surface. Many oil and gas wells are being drilled in water depths up to 3,000 feet and in the future wells will be drilled in water of much greater depths. However, it may take many hours for a specific mud sample to reach the water surface, due to flow rate and distance, and in the meantime, the bore hole may suffer damage due to incorrect mud weight. It is also obvious that gas in the mud should be detected as soon as possible due to the danger of fire when the gas reaches the surface. Therefore, it would be advantageous to measure various properties of the drilling mud such as the weight of the drilling mud, and the presence and the amount of gas long before the mud reaches the water surface.

Therefore, the present invention is directed to measuring properties of the drilling mud at a point below the water surface, such as at the bottom of the water, in order to take whatever corrective action is necessary to modify the drilling mud in order to overcome any problems encountered in the well bore. For instance, the mud weight may be changed due to downhole conditions encountered, such as encountering water, gas, oil, and changes due to the addition of bit cuttings. However, the drilling mud, under ambient conditions which exist at the bottom of the water surface, is subjected to factors, such as compression due to hydrostatic pressure. The conventional methods of measuring the properties of mud at the surface are not suitable for use at an underwater location. For example, when the mud is under compression due to hydrostatic pressure, the gas therein is compressed and its volume is diminished while the fluid and mud particles are not compressible, and does not reduce in volume with application of pressure. Because of this the mud weight is not changed drastically if gas permeates the mud when the conglomerate is subjected to high presssure and thus the weight of the mud is not an accurate indication of its gas content.

SUMMARY

The present invention is directed to a method and apparatus for measuring physical properties of drilling mud in an underwater well, such as measuring the mud weight and gas content near the bottom of the water rather than waiting until the mud reaches the water surface.

The present invention is further directed to collecting a sample of the drilling mud at a point underwater in a closed container under ambient conditions and measuring the properties of the mud, and transmitting signals to the water surface from the underwater measurement thereby providing information concerning the drilling mud without waiting for the mud to return to the water surface.

A further object of the present invention is the provision of collecting at a point underwater in a closed container a sample of mud from the annulus between the drilling string and a riser pipe, measuring the pressure in the container, expanding the size of the container to reduce the pressure therein to a predetermined amount, and measuring the amount of expansion of the container required to reduce the pressure whereby the amount of gas in the drilling mud may be determined.

A still further object of the present invention is directed to measuring the weight of the drilling mud collected in the closed container while under hydrostatic pressure. In addition, the weight of the mud is measured after the container is expanded to reduce the pressure therein to a predetermined amount, such as atmospheric pressure, and preferably at a container spaced from the top so as to measure the weight of the drilling mud after the gas has at least partially separated therefrom.

Yet a still further object of the present invention is the provision of providing a sampling chamber having an inlet connected to the riser pipe and a vented outlet with valve means connected to the inlet and outlet and controlled from the water surface for obtaining and holding in the chamber a sample of the drilling mud adjacent the bottom of the water. Pressure measuring means are connected to the chamber for measuring the pressure of the sample in the chamber and weight measuring means are connected to the sampling chamber for measuring the weight of the sample of mud in the chamber. The chamber includes means for expanding the chamber, such as a control piston, for reducing the pressure of the sample a predetermined amount, such as to atmospheric pressure, and measuring means is connected to the piston to measure the amount of expansion of the chamber to reduce the pressure a certain amount in order to measure the amount of gas in the sample. Readout means are provided above the water surface and connected to all of the underwater measuring means.

Other and further features and advantages will be readily apparent from the following description of the preferred embodiment.

BRIEF DESCRIPTION OF THE DRAWINGS

FIG. 2 is a schematic elevational view of the measuring apparatus of the present invention.

DESCRIPTION OF THE PREFERRED EMBODIMENT

Figure 1:
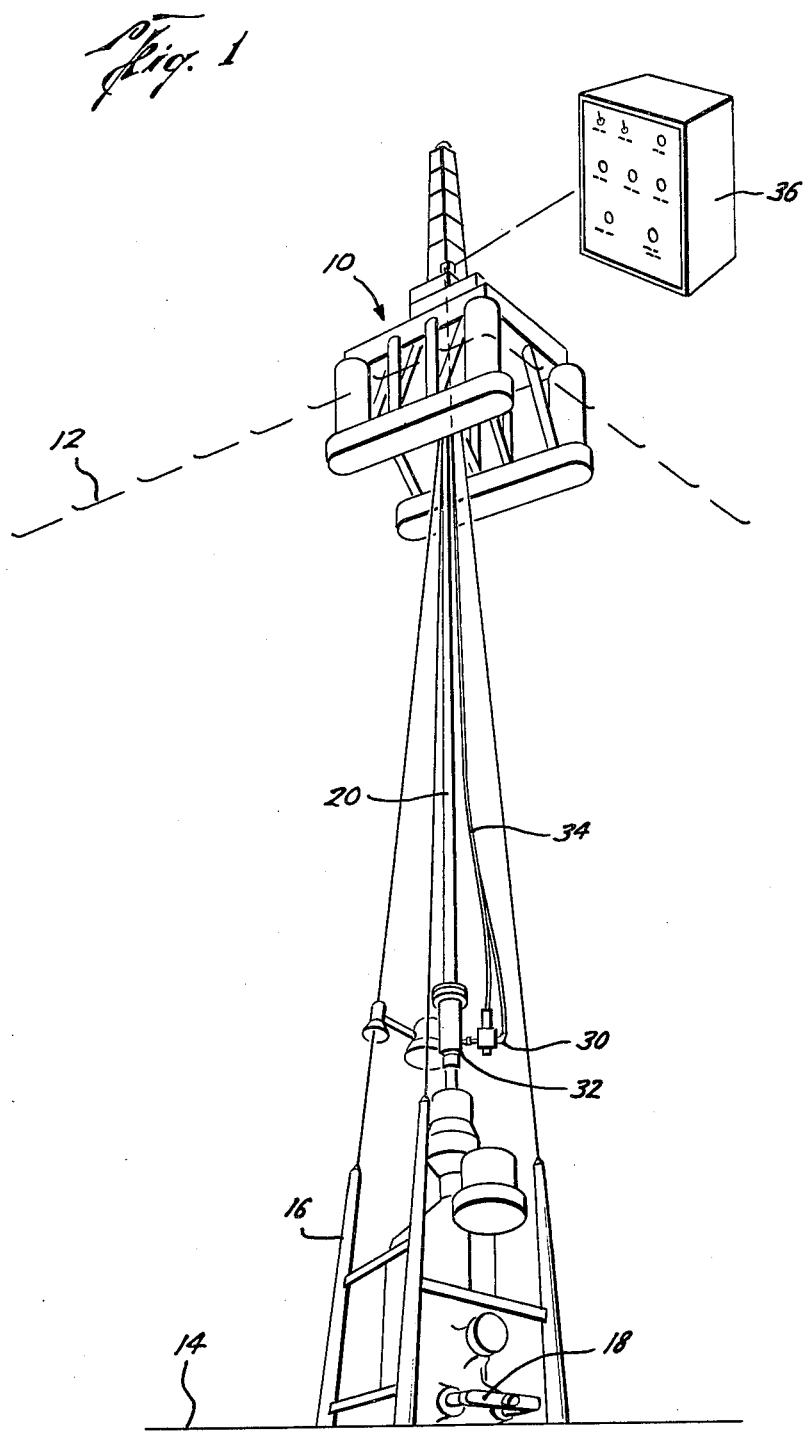
FIG. 1 is an elevational view, illustrating a drilling platform positioned on the surface of the water and drilling an underwater well, and showing the use of the present invention for measuring properties of drilling mud at a point beneath the water.

Referring to the drawings, and particularly to FIG. 1, a drilling rig generally indicated by the reference numeral 10 is positioned on the surface 12 of water for drilling an underwater well into the water bottom 14 through the usual underwater equipment 16 and blowout preventer stack 18. A pipe riser 20 is provided connecting between the underwater equipment 16 and the drilling rig 10 through which a drilling string 22 (FIG. 2) is rotated to drill the well bore. As is conventional, drilling mud is pumped down the drilling string 22 where it comes out of the drilling bit and rises up in the annulus 24 between the drilling string 22 and the pipe riser 20.

The present invention is directed to providing an apparatus generally indicated by the reference numeral 30 for measuring various properties of the drilling mud at a position underneath the surface 12 of the water which is connected to a riser joint 32 for sampling and measuring the mud weight and gas content of the drilling mud in the annulus 24 adjacent the bottom 14 of the water rather than waiting until the mud reaches the drilling platform 10. Suitable control and measuring lines, generally indicated by the reference numeral 34, are connected between the measuring apparatus 30 and the drilling rig 10 to provide controls and to provide readouts to a panel 36 on the drilling rig 10.

Referring now to FIG. 2, sampling means, generally indicated by the reference numeral 38, is provided which includes a sampling chamber 40 which is in fluid communication with the annulus 24 by being connected to the riser joint 32 for receiving a sample of the drilling mud from the annulus 24 adjacent the bottom of the water 14. The chamber 40 is provided with an inlet valve 42 and an outlet valve 44 which are controlled by electrical lines 46 and 48, respectively, which form a portion of the control line 34 (FIG. 1). Valve 44 vents the contents of the chamber 40 into the water. When the valves 42 and 44 are open, the high pressure drilling mud from the annulus 24 flows into the sample chamber 40 to fill the chamber 40 under ambient conditions. When the valves 42 and 44 are closed, a sample of the mud is trapped and held in the chamber 40 for testing. Suitable means for measuring mud weight is connected to the sample chamber 40, such as a differential pressure transducer 50, which is connected to the vertical points 52 and 54 of the chamber 40 for measuring the differential pressure of a predetermined amount of drilling mud which is a measurement of the weight of the drilling mud between the points 52 and 54. Preferably, the points 52 and 54 are below the top of the chamber 40 as will be more fully explained hereinafter. Suitable signaling lines 53 lead from the transducer 50 through the cable 34 to the panel 36 (FIG. 1) to transmit electrical signals to the surface and display them to provide a readout above the water surface for indicating the weight of the underwater mud.

Means are provided for expanding the size of the sampling chamber 40 such as a piston 54 movable in a portion 56 of the sampling chamber 40. The movement and position of the piston 54 is controlled by a second piston 58 connected to the first piston 54 by a rod 60 and positioned in a chamber 62. The chamber 62 has fluid control lines 64 and 66 in communication with the interior of the cylinder 62 on opposite sides of the piston 58. The lines 64 and 66 are connected to a line 68 for supplying fluid, such as hydraulic fluid, which is supplied through the control line 34 from the surface. Electrically operated solenoid valves 70, 72, 74, and 76, are suitably controlled by electrical lines 78, 80, 82, and 84, respectively, which are incorporated within the control cable 34 for control from the surface for moving the piston 58 and in turn controlling the position of the piston 54 so as to control the size of the sample chamber 40, as will be more fully discussed hereinafter. Control line 66 includes a fluid choke 67 for slowly controlling the upward movement of the piston 58. Solenoid valves 70 and 72 control the admission of hydraulic fluid through lines 64 and 66, respectively to the opposite sides of piston 58. Solenoid valves 74 and 76 are vent valves for venting the opposite sides of the piston 58.

Means are provided for measuring the position of the piston 54 and thus providing a measurement of the amount of expansion of the sample chamber 40. For example, a potentiometer transmitter having a potentiometer coil 86 supplied by a voltage through lines 88 and in contact with an arm 90 may be provided connected to the piston 58 and thus movable in response to the movement of the piston 54. An electrical line 92 transmits an electrical signal to the surface to the panel 36 through a meter such as a volt meter 94 which provides a readout proportional to the movement of the piston 54.

A pressure transducer 100 is provided connected to the sampling chamber 40 for monitoring the pressure in the sampling chamber and electrical lines 102 are provided connected in the cable 34 to transmit to the panel 36 a reading of the pressure in the sampling chamber 40.

Suitable limit switches 104 and 106 may be provided connected in the chamber portion 56 for engagement with the piston 54 for monitoring the travel of the piston 54.

In use, the piston 54 is moved downwardly to assume the position shown in FIG. 2 against limit switch 106. This is accomplished by opening valve 70 and 76 while closing valves 72 and 74 to provide pressure from fluid line 68 through valve 70, through line 64 to the backside 63 of the second piston 58 while venting the front side 65 of piston 58. With the piston 54 in its lowermost position, the sample chamber is reduced in size. Valves 42 and 44 are opened to allow the high pressure drilling mud from the annulus 24 to flow through valve 42 into the sampling chamber 40 and through the outlet valve 44 into the water until chamber 40 is filled. When the sampling chamber 40 is filled, the valves 42 and 44 are closed, thereby entrapping a sample of the drilling mud under ambient conditions in the sample chamber 40. The drilling mud present in the sampling chamber 40 between the points 50 and 52 produces a hydrostatic differential pressure across the differential pressure transducer 50 to provide an electrical signal on lines 53 which is transmitted to the water surface to provide an indication of the weight of the drilling mud while under pressure at the underwater position. However, the mud weight measured at this time includes the drilling mud under hydrostatic pressure, and includes any gas trapped therein. of course, the mud, and any oil, water, or cuttings entrapped therein, is not compressible; but if a quantity of gas is present in the mud sample, the gas would be compressed depending upon the amount of hydrostatic pressure to which it is subjected at the sampling depth. Therefore, while the weight measurement, under hydrostatic compression, would be an indication of mud weight, it would not be an accurate indication of the amount of gas in the sample. In order to detect the presence and amount of gas in the drilling mud, the sampling chamber 40 is expanded to reduce the pressure, as measured by the pressure transducer 100, from the ambient condition to a lower level, such as atmospheric pressure, by moving the piston 54 upwardly to increase the size of the sampling chamber 40. If only mud or liquids were present in the sampling chamber 40, then the piston movement required to reduce the pressure a predetermined amount would be small since the mud and liquids are not compressible. However, if gas is present in the drilling mud, the piston movement required to reduce the pressure the same predetermined amount in the sampling chamber 40 would vary in proportion to the quantity of gas present in the drilling mud. Therefore, the amount of travel of the piston 40 required to reduce the pressure in the sampling chamber 40 a predetermined amount is a measure of the quantity of gas present in the drilling mud. It is preferable to reduce the pressure in the sampling chamber 40 to atmospheric pressure since the resulting measurements of mud weight and amount of gas can again be taken under conditions in which the measurements are conventionally performed.

Therefore, with the sample of mud filling the chamber 40 and the piston 54 in its extended position, as shown in FIG. 2, valve 70 is closed and vent valve 74 is opened allowing the high pressure from the space 63 behind the piston 58 to be vented whereby the pressure of the mud in the sample chamber 40 will cause the piston 54 to move upwardly expanding the size of the chamber 40. The piston 54 will move upwardly until the pressure in the sample chamber 40 approximately equals the pressure in the space 63. Valve 72 is then opened to allow pressure from the line 68 to flow through the choke 67 in line 66 and into the cylinder portion 58 to slowly move the piston 58 upwardly until a lower pressure, preferably atmospheric pressureas monitored by the pressure transducer 100, is obtained in the sample chamber 40. When the pressure in the chamber 40 reaches lower pressure, valve 72 is closed stopping the movement of the piston 58 and thus the movement of piston 54. The potentiometer arm 90 which moves with the piston 54, provides a surface readout on meter 94 of how far the piston 54 moved to reduce the pressure in the sample chamber 40 to the lower amount. This movement is an indication and a measurement of the amount of gas in the mud sample in the sample chamber 40. That is, knowing the change in pressure and volume upon expansion of the chamber 40, allows the amount of gas to be determined. If sufficient gas were present in the mud sample, then the movement of the piston 54 would be great enough to actuate the limit switch 104 which could be positioned to precisely measure a preselected ratio of gas, such as 50% and transmit this detectable point to the water surface to actuate an alarm to warn rig personnel that a critical gas content has been reached.

After the sample chamber 40 has been expanded, the gas will tend to separate from the drilling mud, and being lighter than the drilling mud and other fluids and cuttings which might be accumulated in the drilling mud, will form at the top of the sample chamber 40. When this occurs, a second mud weight test can be obtained by the differential pressure transducer 50, which, since it is positioned below the top of the sample chamber 40, is a more accurate measurement of the weight of the mud with the gas at least partially separated therefrom.

The present invention, therefore, provides for measuring the mud weight and the gas content at a position under the water rather than waiting until the mud reaches the water surface and, therefore, provides the opportunity to take whatever steps are necessary to correct any irregularities or defects in the drilling mud.

The method of the present invention is apparent from the foregoing description of the apparatus. However, the method includes measuring properties of drilling mud in an underwater well in which the mud flows downwardly through a drilling string and up the annulus between the drilling string and a riser pipe by collecting, at a point underwater, in a closed container, a sample of the mud from the annulus under ambient conditions, and measuring the weight of the mud the closed container and transmitting signals to the surface indicating the weight measured. The method further includes expanding the container to reduce the pressure therein to a lower pressure, such as atmospheric pressure, and measuring the weight of the mud in the container. The method still further contemplates measuring the amount of expansion of the container required to reduce the pressure to a predetermined amount whereby the amount of gas in the drilling mud may be determined.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, and steps of the process, will readily suggest themselves to those skilled in the art and which are encompassed within the spirit of the invention and the scope of the appended claims.

What is claimed is:

1. An apparatus for measuring the properties of drilling mud in an underwater well in which the mud flows downward through a drilling string and up the annulus between the drilling string and a riser pipe comprising, a sampling chamber having an inlet connected to the riser and a vented outlet, valve means connected to the inlet and to the outlet and controlled from the water surface for obtaining and holding in the chamber a sample of the drilling mud from the annulus, said chamber including means for expanding said chamber for reducing the pressure of the sample to a predetermined pressure, pressure measuring means connected to the chamber for measuring the pressure of the sample of mud in the chamber, mud weight measuring means connected to the sampling chamber for measuring the weight of the sample of mud in the chamber, means for measuring the amount of expansion of the chamber thereby measuring the amount of gas in the sample, and readout means above the water surface connected to all of the measuring means.

2. The apparatus of claim 1 wherein the mud weight measuring means is positioned spaced below the top of the chamber.

3. A method of measuring properties of drilling mud in an underwater well in which the mud flows downward through a drilling string and up the annulus between the drilling string and a riser pipe comprising, collecting at a point underwater in a closed container a sample of the mud from the annulus under ambient conditions, expanding the container to an amount to reduce the pressure therein to atmospheric pressure, and measuring the weight of the mud in the container and transmitting signals to the water surface resulting from the weight measurement.

4. The method of claim 3 wherein the weight is measured by measuring the differential pressure across a predetermined vertical column of mud spaced below the top of the container.

5. A method of measuring properties of drilling mud in an underwater well in which the mud flows downward through a drilling string and up the annulus between the drilling string and a riser pipe comprising, collecting at a point underwater in a closed container a sample of the mud from the annulus under ambient conditions, measuring the pressure in the container, expanding the size of the container to reduce the pressure therein, measuring the amount of expansion of the container required to reduce the pressure whereby the amount of gas in the drilling mud may be determined, and transmitting signals to the water surface of the measurement of the container expansion.

6. A method of measuring the weight of drilling mud in an underwater well in which the mud flows downward through a drilling string and up the annulus between the drilling string and a riser pipe comprising, collecting at a point underwater in a closed container a sample of the mud from the annulus, measuring the weight of the mud in the closed container, and transmitting signals to the water surface of the measured weight of the mud.

7. An apparatus for measuring the properties of drilling mud in an underwater well in which the mud flows downwardly through a drilling string and up the annulus between the drilling string and a riser pipe comprising, a sampling chamber having an inlet connected to the riser and an outlet vented to the water, valve means connected to the inlet and to the outlet and controlled from the water surface for obtaining and holding in the chamber a sample of the drilling mud from the annulus, said chamber including means for expanding the chamber for reducing the pressure of the sample to a predetermined pressure, pressure means connected to the chamber for measuring the pressure of the sample of mud in the chamber, means for measuring the amount of expansion of the chamber thereby measuring the amount of gas in the sample, and readout means above the water surface connected to the measuring means.

8. An apparatus for measuring the properties of drilling mud in an underwater well in which the mud flows downwardly through a drilling string and up the annulus between the drilling string and a riser pipe comprising, a sample chamber having an inlet connected to the riser and an outlet vented to the water, valve means connected to the inlet and to the outlet and controlled from the water surface for obtaining and holding in the chamber a sample of the drilling mud from the annulus, said chamber including means for expanding said chamber for reducing the pressure of the sample to a predetermined pressure, pressure means connected to the chamber for measuring the pressure of the sample of mud in the chamber, mud weight measuring means connected to the sampling chamber for measuring the weight of the sample of mud in the chamber, and readout means above the water surface connected to the measuring means.

* * * * *